United States Patent [19]

Hild

[11] 4,094,362
[45] June 13, 1978

[54] APPARATUS FOR FINE GRADING COMPACTED EARTH

[76] Inventor: Melvin O. Hild, 923 W. 15th, Grand Island, Nebr. 68801

[21] Appl. No.: 747,662

[22] Filed: Dec. 6, 1976

[51] Int. Cl.² ............. A01B 33/02; A01B 33/10
[52] U.S. Cl. ............................. 172/120; 83/840; 144/218; 172/540; 172/548; 407/48
[58] Field of Search ............ 172/120, 540, 548, 549, 172/604; 83/839–844; 144/218, 230; 29/105 R

[56] References Cited

U.S. PATENT DOCUMENTS

| B 545,935 | 1/1976 | Barbour, Jr. | 83/839 X |
|---|---|---|---|
| 924,078 | 6/1909 | Keene | 144/230 |
| 1,661,692 | 3/1928 | Everest | 172/548 X |
| 1,699,151 | 1/1929 | Miller et al. | 172/540 |
| 1,705,251 | 3/1929 | Hollis | 144/218 |
| 2,691,933 | 10/1954 | Emerson | 172/548 |
| 3,134,412 | 5/1964 | Schmitt | 144/230 |
| 3,331,561 | 7/1967 | Morkoski et al. | 144/230 X |
| 3,347,188 | 10/1967 | Richey | 172/548 X |
| 3,899,947 | 8/1975 | Faltim | 144/218 |
| 3,995,699 | 12/1976 | Blucher et al. | 172/548 X |

FOREIGN PATENT DOCUMENTS

| 234,958 | 6/1925 | United Kingdom | 172/120 |

Primary Examiner—Paul E. Shapiro
Attorney, Agent, or Firm—Henderson, Strom, Sturm, Cepican & Fix

[57] ABSTRACT

A device for cutting, chipping and scraping compacted earth is disclosed. The apparatus is affixed to a prime mover for rotary engagement with the earth, whereby the compacted earth is selectively loosened and/or moved. The blade design disclosed is particularly useful for close accurate work around concrete forms and the like. Other embodiments are disclosed for large area grading.

4 Claims, 6 Drawing Figures

4,094,362

APPARATUS FOR FINE GRADING COMPACTED EARTH

BACKGROUND OF THE INVENTION

This invention relates generally to earth working apparatus, and particularly to devices which fine grade compacted earth around construction sites.

The prior art is crowded with numerous earth working tools and devices such as plows and cultivators. The objective of these apparatus is to thoroughly pulverise the soil at a maximum depth so that crops will develop mature root systems. For example, attention is directed to the cultivators disclosed in U.S. Pat. Nos. 3,502,153; 2,835,182; and 2,545,735. These common garden cultivators employ a prime mover, such as a gasoline engine, to rotate a horizontal shaft having earth engaging digger-cutters thereon. The blades in each instance are designed to dig into the ground and pull up and pulverize as much soil as possible.

Almost every construction site must be fine graded according to a particular contour plan to ensure proper drainage and landscaping. The ground around the site is normally compacted due to the use of heavy vehicles during the construction phase. Normally, the fine grading is done by hand because there is no machine available which will reshape only the surface of the ground. Cultivators certainly are unsuitable for this job because they dig too deeply and thus produce an undesirable artificial surface which will eventually lose its contour due to settling.

Furthermore, there is a need in the construction field for a device which will accurately loosen the ground around and between concrete forms to insure complete and full slab depth and edge formation. One embodiment of the instant invention is designed to accomplish this purpose, and to thus replace the inaccurate and time consuming manual methods heretofore employed.

BRIEF SUMMARY OF THE INVENTION

It is an object of this invention to provide an apparatus for cutting, chipping and scraping compacted earth which is durable of construction, inexpensive of manufacture and extremely effective in use.

It is another object of this invention to provide an apparatus for cutting, chipping and scraping compacted earth which uses cutting blades which are easily removed for sharpening.

It is another object of this invention to provide an apparatus for cutting, chipping and scraping compacted earth which uses cutting blades which can be readily replaced if damaged.

It is another object of this invention to provide an apparatus for cutting, chipping and scraping compacted earth which cuts a straight square line.

It is a further object of this invention to provide an apparatus for cutting, chipping and scraping compacted earth which is particularly well suited for fine grading of construction sites.

It is a further object of this invention to provide an apparatus for cutting, chipping and scraping compacted earth which is particularly well suited for accurately removing earth around concrete forms, such as in excavation work in preparation for formation of slabs, footings, sidewalks, etc.

It is a further object of this invention to provide an apparatus for cutting, chipping and scraping compacted earth which employs a multiplicity of blades which do not cultivate the earth being worked on, but rather mold the earth to a desired contour.

It is an even still further object of this invention to provide an apparatus for cutting, chipping and scraping compacted earth which may be embodied in a hand operated device or a more sophisticated apparatus in the large machinery category.

These and other objects are accomplished by providing a device for cutting, chipping and scraping compacted earth which is affixed to a prime mover for rotary engagement with the earth, whereby soil is selectively loosened and/or moved. The blade design disclosed is particularly useful for close accurate work around concrete forms and the like. Other embodiments are disclosed for large area grading.

BRIEF DESCRIPTION OF THE DRAWINGS

For a better understanding of the invention as well as other objects and further features thereof, reference is made to the following detailed disclosure of the invention taken in conjunction with the accompanying drawings wherein.

DESCRIPTION OF THE PREFERRED EMBODIMENTS

Figure 1:
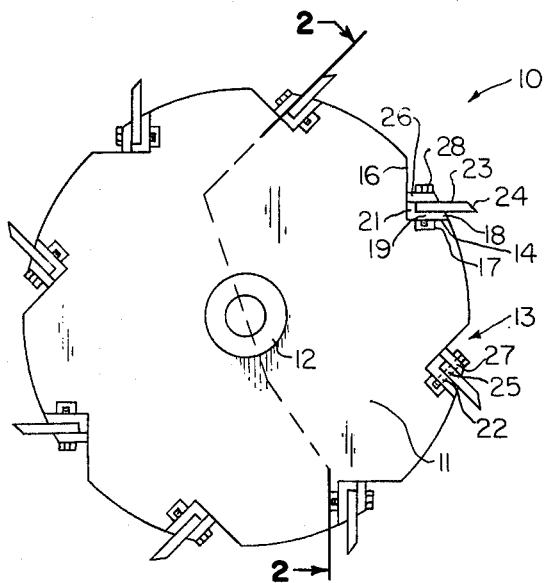
FIG. 1 is a side plan view of the cutting apparatus of the instant invention.

Referring now to FIG. 1, the side elevation of one embodiment of the instant invention can be seen. The cutter comprises a circular planar base element 11 having a hole 12 through the center thereof. Hole 12 is of a size of slidingly engage a shaft member upon which the cutting apparatus will be mounted. A plurality of notches 13 are cut into the base element and evenly spaced along the periphery thereof. Each of the notches 13 comprise two legs 14 and 16 perpendicularly positioned relative to each other. Also, it should be noted that each of the legs 14 and 16 are perpendicular to a radius of the base element 11. Each of the legs 14 of the notches includes a slot 17 cut therein approximately in the middle thereof. An "L" shaped bracket 18 is fixed to the legs 14 and 16 in such a manner that the long leg of the bracket is affixed to leg 14 of the notch and the short leg 21 is affixed to the other leg 16. The bracket 18 further has a hole therethrough 22 which is threaded to engage a bolt as will hereinafter be explained. The actual cutting blade 23 is positioned in the bracket 18 with the cutting edge 24 protruding outwardly. Blade 23 also has an unthreaded hole 25 therethrough.

A fixing plate 26 is positioned on top of blade 23, and, likewise, has an unthreaded hole 35 therethrough. A bolt 25 is positioned through the holes in fixing plate 26, blade 23 and threadingly engaged with the hole 22 in bracket 19. The bolt holds the elements together and ensures that the blade is maintained in the proper position. Also, this particular arrangement allows easy removal or replacement of the blade 23.

Figure 2:
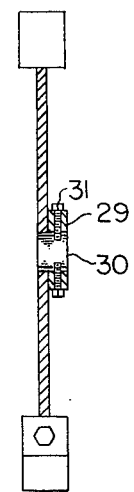
FIG. 2 is a front plan cross sectional view of the cutting apparatus of the instant invention taken along lines 2—2 of FIG. 1.

FIG. 2 shows that the blades 23 are rectangular in configuration and that there is affixed to the side of the base member 11 a collar 29 which has a hole 30 therethrough aligned with the hole 12 in base member 11. The hole in the collar is approximately the same size as that through the member 11. A bolt 31 projects through the collar for affixment to a drive shaft.

Figure 3:
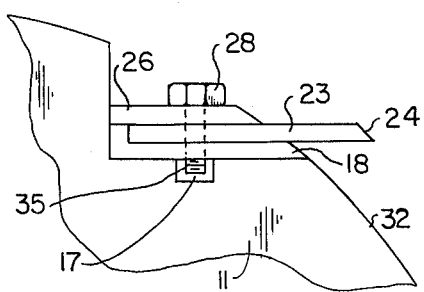
FIG. 3 is a sectional view of the cutting apparatus of the instant invention showing the arrangement of elements which hold the cutting blade in proper position.

FIG. 3 shows a closeup of the blade attachment and is used to particularly point out that the blade 23 projects a distance past the periphery 33 of the base member 11. As shown in this Figure and FIG. 1, the cutting device is designed to rotate in a clockwise direction. In other words, the edge 24 of blade 23 is most effective when the sharpened portion engages the earth in a slicing-type movement. The broad flat edge 24 provides for the removal of only small amounts of surface dirt and therefore allows positive control of contour modification.

In close quarters, or where extreme edge line accuracy is required, a single cutting device such as shown in FIGS. 1 and 2 may be employed. Mounted on the drive shaft of a gasoline powered cultivator, the cutting device is very easily controlled and maneuvered to follow a desired line or edge adjacent to a form. Any suitable number of cutting devices may be mounted on such a drive shaft, depending upon the amount of surface area to be worked.

Figure 4:
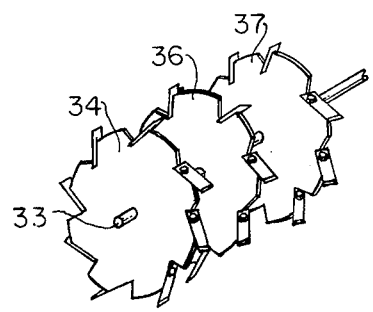
FIG. 4 is a perspective view of a series of cutting devices affixed on a common drive shaft.

FIG. 4 shows a drive shaft 33 having affixed thereto a plurality of cutting devices 34–39. Such an arrangement would be used on a prime mover, for example, a cultivator motor and output shaft, to evenly grade a medium sized piece of ground.

Figure 5:
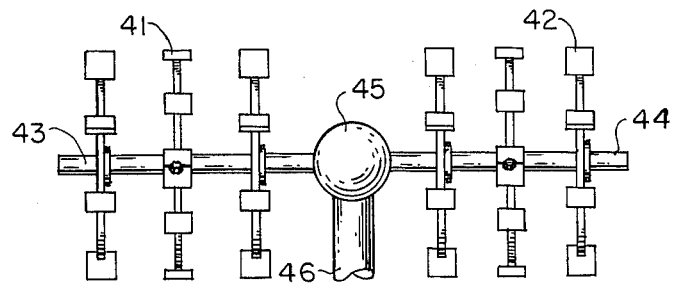
FIG. 5 is a top plan view of another embodiment of the cutting apparatus of the instant invention.
Figure 6:
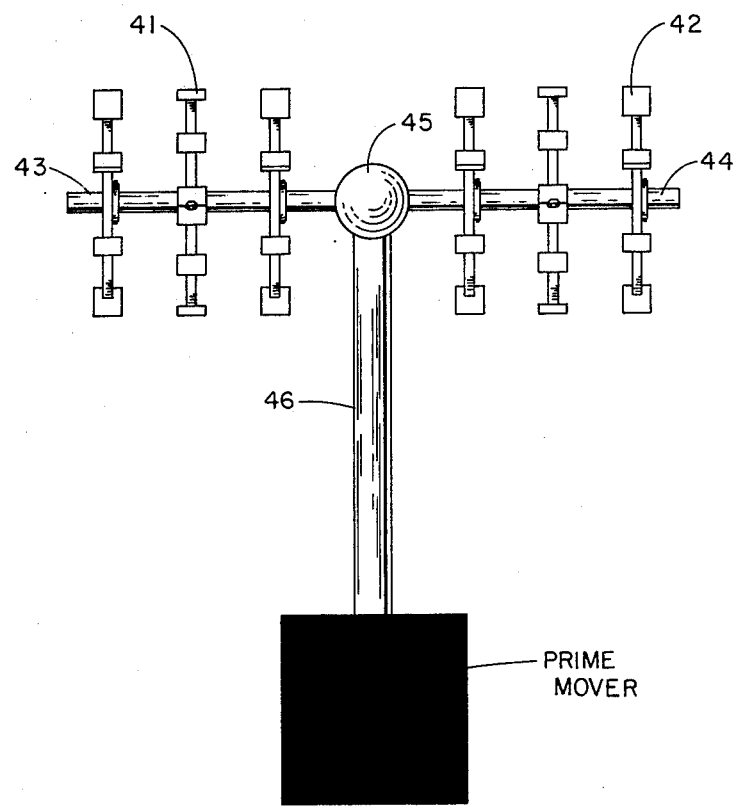
FIG. 6 is a top plan view of the cutting apparatus affixed to a prime mover.

FIG. 5 shows a top plan view of a larger embodiment of the instant invention which would be affixed to the three point hitch of a tractor. Two groups of cutting blades 41 and 42 are affixed to drive shafts 43 and 44 which project from a reduction box 45, which, in turn is affixed at 46 to the power takeoff of the tractor. The ends of drive shafts 43 and 44 would be attached to the outside arms of the three point hitch.

The specific size of cutting device is relative to the specific job to be done, and the type of prime mover employed. It is doubtful that anything under 10 inches in diameter would be practical; however, the upper end of the range is substantially unlimited. If the prime mover selected is a garden-type cultivator, a base diameter of about 14 inches is usually quite satisfactory. Obviously, too, the blade size may be varied to accommodate different situations. A suitable blade for a 14-inch base has been found to be 3/16 × 1 × ⅛ inch, with one-fourth to one-half the blade extending past the base periphery. Amy amount of the blade length can protrude past the periphery, but for strength, this amount is usually not more than one-half. Furthermore, the cutting device has been described as being useful in close work around forms, but it is also extremely useful in setting forms. For example, if an edge line is layed and cut with the instant device, the forms may be easily inserted, or set up, in a very accurate and quick manner.

It will be understood that various changes in the details, materials, steps and arrangements of parts, which have herein been described and illustrated in order to explain the nature of the invention, will occur to and may be made by those skilled in the art upon a reading of the disclosure within the principles and scope of the invention.

I claim:

1. Apparatus for fine grading compacted earth including a cutting blade, said blade comprising:
    (a) a substantially planar circular base member having a hole through the center thereof and a plurality of 90° notches evenly spaced about the circumference of said base member, each notch including first and second legs which, in turn, are each perpendicular to the plane of a radius of said base member;
    (b) a collar affixed to one side of said base member, said collar having a hole therethrough substantially the same size as said hole through said base member and aligned therewith, said collar further having fixing means thereon for decreasing at least partially the diameter of said hole through said collar;
    (c) a slot in said first leg of each of said 90° notches;
    (d) an L-shaped bracket having a threaded hole through the long leg thereof fixed to said first leg of each of said 90° notches such that said threaded hole is aligned with said slot and the short leg of the bracket is in contact with said second leg of said 90° notches;
    (e) a rectangular blade having a sharpened edge positioned on each of said L-shaped brackets and projecting past the periphery of said base member, each of said blades having a hole therethrough aligned with said threaded hole in said L-shaped bracket;
    (f) a substantially planar rectangular fixing plate positioned on each of said blades, each of said fixing plates having a hole therethrough aligned with said hole in said blade and said threaded hole in said L-shaped bracket; and
    (g) a bolt projecting through each of said aligned holes and threadingly engaged with said threaded hole in said L-shaped bracket whereby said blades are fixedly held in position on said base member.

2. The apparatus of claim 1 further including:
    a prime mover;
    a horizontal driven shaft connected to said prime mover; and
    said cutting blade described in parts (a)–(g) of claim 1 affixed to said driven shaft by said fixing means.

3. The apparatus of claim 2 further including a multiplicity of said cutting blades, described in parts (a)–(g), affixed to said driven shaft.

4. The apparatus of claim 3 wherein said multiplicity of cutting blades are evenly spaced along said driven shaft.

* * * * *